US012243321B2

(12) United States Patent
Derbisz

(10) Patent No.: US 12,243,321 B2
(45) Date of Patent: Mar. 4, 2025

(54) METHOD FOR DETERMINING A SEMANTIC FREE SPACE

(71) Applicant: Aptiv Technologies AG, Schaffhausen (CH)

(72) Inventor: Jakub Derbisz, Cracow (PL)

(73) Assignee: APTIVE TECHNOLOGIES AG, Schaffhausen (CH)

( * ) Notice: Subject to any disclaimer, the term of this patent is extended or adjusted under 35 U.S.C. 154(b) by 501 days.

(21) Appl. No.: 17/457,407

(22) Filed: Dec. 2, 2021

(65) Prior Publication Data
US 2022/0171975 A1 Jun. 2, 2022

(30) Foreign Application Priority Data

Dec. 2, 2020 (EP) ..................................... 20211232

(51) Int. Cl.
*G06V 20/56* (2022.01)
*G06F 18/2431* (2023.01)
(Continued)

(52) U.S. Cl.
CPC .......... *G06V 20/56* (2022.01); *G06F 18/2431* (2023.01); *G06T 7/70* (2017.01); *G06V 10/95* (2022.01); *G06T 2207/30252* (2013.01)

(58) Field of Classification Search
CPC .... G06V 10/751; G06V 20/58; G06V 10/764; G06V 10/82; G06V 20/64; G06V 20/10;
(Continued)

(56) References Cited

U.S. PATENT DOCUMENTS 7,639,171 B2   12/2009  Alland et al.
9,470,777 B2   10/2016  Arage
(Continued)

FOREIGN PATENT DOCUMENTS

CN    103559791    2/2014
CN    111401208    7/2020
(Continued)

OTHER PUBLICATIONS

"Extended European Search Report", EP Application No. 20209230.0, May 4, 2021, 10 pages.
(Continued)

*Primary Examiner* — Chan S Park
*Assistant Examiner* — Sebastian-Sy Vuchi Ngo
(74) *Attorney, Agent, or Firm* — Harness, Dickey & Pierce, P.L.C.

(57) ABSTRACT

A method for determining a semantic free space in an environment of a vehicle comprises capturing a two dimensional visual image from the environment of the vehicle via a camera and determining a limitation of a free space within the visual image. Via a sensor, distance data of objects are captured and assigned to the visual image, and the limitation of the free space is transferred to a bird's-eye view based on the assigned distance data. For objects identified in the visual image a respective bounding box and a respective classification are determined. Objects limiting the free space are selected, and their bounding box is assigned to the limitation of the free space in the bird's-eye view. Finally, segments of the limitation of the free space are classified according to the classification of each bounding box of the selected objects.

20 Claims, 11 Drawing Sheets

(51) Int. Cl.
  *G06T 7/70* (2017.01)
  *G06V 10/94* (2022.01)
(58) Field of Classification Search
  CPC .. G06V 10/147; G06V 2201/07; G06V 20/00;
         G06V 20/44; G06V 2201/08; G06T
         2207/20021; G06T 2207/10028; G06T
         2207/20081; G06T 2215/16; G06T 7/97;
         G06T 2207/20084; G06T 7/70; G06T
         15/00; G06T 11/00; G06T 2210/12; G06T
         7/13; G06T 11/203; G06T 7/136; G06T
         2207/30256; G06T 2210/21
  See application file for complete search history.

(56) References Cited

U.S. PATENT DOCUMENTS

| | | | |
|---|---|---|---|
| 10,303,492 B1 | 5/2019 | Wagner et al. | |
| 10,430,641 B2 | 10/2019 | Gao | |
| 11,354,913 B1* | 6/2022 | Houston | G06F 18/24 |
| 2013/0266186 A1* | 10/2013 | Zhang | G06V 20/588 |
| | | | 382/104 |
| 2015/0012204 A1 | 1/2015 | Breuer et al. | |
| 2015/0353083 A1 | 12/2015 | Hasberg et al. | |
| 2016/0116916 A1 | 4/2016 | Pink et al. | |
| 2018/0188059 A1 | 7/2018 | Wheeler et al. | |
| 2018/0329034 A1 | 11/2018 | Bilik et al. | |
| 2018/0350086 A1 | 12/2018 | Sweet et al. | |
| 2019/0271549 A1 | 9/2019 | Zhang et al. | |
| 2019/0286153 A1* | 9/2019 | Rankawat | G05D 1/0246 |
| 2019/0340775 A1 | 11/2019 | Lee et al. | |
| 2019/0384302 A1* | 12/2019 | Silva | G06V 10/764 |
| 2020/0250485 A1* | 8/2020 | Nagori | G06F 18/2163 |
| 2020/0334544 A1 | 10/2020 | Liu et al. | |
| 2020/0356415 A1 | 11/2020 | Goli | |
| 2021/0291816 A1 | 9/2021 | Lilja et al. | |
| 2021/0300353 A1 | 9/2021 | Pär Oscar Carlander et al. | |
| 2021/0331679 A1 | 10/2021 | Lilja et al. | |
| 2021/0333380 A1 | 10/2021 | Lilja et al. | |
| 2022/0012466 A1* | 1/2022 | Taghavi | G06T 7/73 |

FOREIGN PATENT DOCUMENTS

| | | |
|---|---|---|
| DE | 102009009047 | 8/2010 |
| DE | 102009022588 | 12/2010 |
| DE | 102016007630 | 12/2017 |
| DE | 102017217972 | 4/2019 |
| DE | 102017126388 | 5/2019 |
| DE | 102019205008 | 7/2020 |
| EP | 3454079 | 3/2019 |
| JP | 2018138402 | 9/2018 |
| WO | 2020140047 | 7/2020 |

OTHER PUBLICATIONS

"Extended European Search Report", EP Application No. 20211232. 2, May 25, 2021, 10 pages.
"Extended European Search Report", EP Application No. 20214293. 1, May 27, 2021, 10 pages.
"Extended European Search Report", EP Application No. 20164443. 2, Sep. 9, 2020, 10 pages.
"Extended European Search Report", EP Application No. 20171489. 6, Sep. 18, 2020, 11 pages.
"Extended European Search Report", EP Application No. 20171491. 2, Sep. 28, 2020, 9 pages.
"Extended European Search Report", EP Application No. 20166617. 9, Oct. 7, 2020, 7 pages.
Aihara, et al., "Free-Space Estimation for Self-Driving System Using Millimeter Wave Radar and Convolutional Neural Network", Mar. 2019, 4 pages.
Bochkovskiy, et al., "YOLOv4: Optimal Speed and Accuracy of Object Detection", Apr. 23, 2020, 17 pages.
Caltagirone, et al., "LIDAR—Camera Fusion for Road Detection Using Fully Convolutional Neural Networks", Sep. 21, 2018, 7 pages.
Casapietra, et al., "Building a Probabilistic Grid-based Road Representation from Direct and Indirect Visual Cues", Jun. 2015, 8 pages.
Chen, et al., "Progressive LiDAR Adaptation for Road Detection", Apr. 2, 2019, 11 pages.
Foroughi, et al., "Free Space Grid for Automotive Radar Sensors", Sep. 2015, pp. 249-256.
Godard, et al., "Digging Into Self-Supervised Monocular Depth Estimation", Aug. 17, 2019, 18 pages.
Guizilini, et al., "3D Packing for Self-Supervised Monocular Depth Estimation", Mar. 28, 2020, 13 pages.
Kunz, et al., "Fast Collision Checking with a Frenet Obstacle Grid for Motion Planning", Jun. 2014, pp. 95-104.
Li, et al., "High Resolution Radar-based Occupancy Grid Mapping and Free Space Detection", Mar. 2018, pp. 70-81.
Liang, et al., "PolyTransform: Deep Polygon Transformer for Instance Segmentation", Jan. 16, 2021, 10 pages.
Lyu, et al., "ChipNet: Real-Time LiDAR Processing for Drivable Region Segmentation on an FPGA", Mar. 5, 2019, 11 pages.
Maneewongvatana, et al., "It's okay to be skinny, if your friends are fat", Dec. 18, 1999, 8 pages.
Nuss, "Consistent Environmental Modeling by use of Occupancy Grid Maps, Digital Road Maps, and Multi-Object Tracking", Jun. 2014, 7 pages.
Redmon, et al., "YOLO9000: Better, Faster, Stronger", Jul. 2017, 9 pages.
Redmon, "YOLOv3: An Incremental Improvement", Apr. 8, 2018, 6 pages.
Redmon, et al., "You Only Look Once: Unified, Real-Time Object Detection", May 9, 2016, 10 pages.
Sundram, et al., "Development of a Miniature Robot for Multi-robot Occupancy Grid Mapping", Jul. 2018, 7 pages.
Suzuki, et al., "Topological Structural Analysis of Digitized Binary Images by Border Following", Apr. 1985, pp. 32-46.
Weiss, "Robust Driving Path Detection in Urban and Highway Scenarios Using a Laser Scanner and Online Occupancy Grids", Jul. 2007, pp. 184-189.
Zhao, et al., "Pyramid Scene Parsing Network", Apr. 27, 2017, 11 pages.
Zou, "Free Space Detection Based on Occupancy Gridmaps", Apr. 2012, 70 pages.
"Foreign Office Action", EP Application No. 20211232.2, Jun. 13, 2023, 7 pages.

* cited by examiner

METHOD FOR DETERMINING A SEMANTIC FREE SPACE

CROSS-REFERENCE TO RELATED APPLICATION

This application claims priority to European Patent Application Number 20211232.2, filed Dec. 2, 2020, the disclosure of which is hereby incorporated by reference in its entirety herein.

BACKGROUND

For safety functions and driver assistance systems in modern vehicles, it is important to determine a drivable region in front of the vehicle. Moreover, autonomous driving strongly relies on the ability to determine such a drivable region. If the coordinates of the drivable region are available, suitable decisions and actions for the navigation of the vehicle can be taken.

For detecting the drivable region in front of the vehicle, a two-dimensional free space is usually determined based on an image taken by a single camera and by direct methods using segmentation techniques. For this task, deep neural networks may be efficiently used.

However, if the free space in front of the vehicle is determined based on an image of a single camera or based on data from another single sensor, a problem remains regarding determining the depth, i.e. the distance from the host vehicle where the camera is installed to further elements in the environment of the vehicle. The distance to the nearest obstacle, however, is a crucial parameter for a proper navigation. Although proposals are available for reliably estimating distances from camera images, the results may suffer e.g. from varying weather conditions and air transparency.

Furthermore, for a proper navigation the type of an obstacle should be known which restricts the free space in front of the vehicle. In other words, a semantic classification of objects in the environment of the vehicle should be available, i.e. whether the object is another vehicle, a pedestrian, or some debris due to which a lane is not available for driving.

Accordingly, there is a need to have a method and a system which are able to determine an accurate distance to an object and a type of the object in an environment of a vehicle.

SUMMARY

The present disclosure relates to a method for determining a semantic free space in an environment of a vehicle. The present disclosure provides a computer implemented method, a computer system, and a non-transitory computer readable medium according to the embodiments given in the following claims, description, and drawings referenced therein.

In one aspect, the present disclosure is directed at a computer implemented method for determining a semantic free space in an environment of a vehicle comprising a camera and a sensor, the sensor being configured to provide distance information. According to the method, a two dimensional visual image is captured from the environment of the vehicle via the camera, and a limitation of a free space is determined within the visual image. Via the sensor, three dimensional distance data are captured with respect to the vehicle for objects in the environment of the vehicle. The distance data are assigned to the visual image, and the limitation of the free space is transferred from the visual image to a bird's-eye view with respect to the vehicle based on the assigned distance data. Objects are identified in the visual image and for each identified object, a bounding box and a classification are determined. Objects limiting the free space are selected from the identified objects, and the respective bounding box of each selected object is assigned to the limitation of the free space in the bird's-eye view. Finally, segments of the limitation of the free space are classified according to the classification of each bounding box of the selected objects.

On one hand, the method provides the limitation of the drivable free space with respect to the vehicle in a bird's-eye view coordinate system. This coordinate system comprises two axes and may be defined in a plane tangent to the lane in which the vehicle is currently driving. Therefore, in bird's-eye view one is looking at this plane from above.

In addition, the limitation comprises segments which are semantically classified and for which the type of the objects limiting the free space is identified. Therefore, the segments may be regarded as semantic segments, and the entire output of the method may be referred to as a semantic free space.

Because the distance to the closest objects with respect to the vehicle and their type are known after performing the method, suitable decisions and actions can be taken regarding the navigation of the vehicle, e.g. in autonomous driving, based on the information provided by the semantic free space. In addition, the camera and the sensor may capture their respective data simultaneously, i.e. the two dimensional visual image and the three dimensional distance data. Due to the simultaneous capturing, the accuracy and the reliability of the output provided by the method, i.e. of the semantic free space, may be improved.

The camera may be a monocular or a stereo camera which is often available in modern vehicles. The sensor may be a LIDAR or radar sensor or any other suitable sensor being able to provide distance or depth information. Hence, there are no extraordinary requirements regarding hardware for performing the method.

The bounding box for an identified object may be a two dimensional frame within the visual image enclosing the respective object entirely and may be defined by respective maximum and minimum values e.g. for x- and y-coordinates. In other words, the bounding box may be simply defined in the visual image by four numbers. The classification of the identified objects includes the type of a respective object, i.e. whether the object is e.g. another vehicle, a pedestrian or simply some debris on the lane.

The method may comprise one or more of the following features:

The limitation of the free space may be determined by applying a first neural network to the visual image. Furthermore, the limitation of the free space may comprise a continuously extending contour of the free space, and the contour may be determined by applying a border following algorithm. Assigning the distance data to the limitation of free space may comprise applying a projecting transformation to the distance data which projects the three dimensional distance data to the two dimensional visual image, and transferring the limitation of the free space from the visual image to the bird's-eye view may comprise applying an inverse transformation of the projecting transformation to the limitation.

The limitation of free space may comprise a plurality of limitation points represented in the visual image, and transferring the limitation of the free space from the visual image to the bird's-eye view may further comprise selecting a predetermined number of closest points from the assigned distance data for each limitation point and estimating a distance of each limitation point with respect to the vehicle as an average of the distances of the closest points.

Determining the bounding box and the classification for each identified object may comprise applying a second neural network to the visual image, and determining the classification may comprise estimating a class probability for each bounding box when applying the second neural network. In addition, a certainty score may be determined for each segment of the limitation of the free space based on the class probability for each bounding box.

A respective distance of a center of each bounding box may be determined with respect to the vehicle based on the three dimensional distance data, and the distance of the center of each bounding box may be assigned to the limitation of the free space in the bird's-eye view. The distance of the center of each bounding box may be determined based on a predetermined number of assigned distance data being closest to the respective center of the bounding box.

An object may be selected for the assignment of its bounding box to the limitation of the free space only if the distance of the center of the bounding box to at least one of the assigned distance data is less than a predetermined distance. The segments of the limitation of the free space may be divided equally by a fixed and predetermined azimuth angle with respect to the vehicle.

According to an embodiment, the limitation of the free space may be determined by applying a first neural network to the visual image. The first neural network may be a convolutional neural network which may perform a road segmentation within the visual image. Due to the first neural network, a fast determination of the limitation regarding the free space may be provided.

The limitation of the free space may further comprise a contour of the free space which extends continuously. The contour may be determined by applying a border following algorithm. The continuously extending contour may be a clear and straight forward representation of the boundary of the free space. In addition, the border following algorithm may provide a fast determination of the contour.

According to a further embodiment, assigning the distance data to the limitation of the free space may comprise applying a projecting transformation to the distance data which projects the three-dimensional distance data to the two-dimensional visual image. In addition, transferring the limitation of the free space from the visual image to the bird's-eye view may comprise applying an inverse transformation of the projecting transformation to the limitation. The projecting transformation may provide an unambiguous assignment for the distance data regarding the visual image. By using the pair of the projecting transformation and its inverse transformation, the mathematical and computational effort for performing the method may be reduced.

The limitation of the free space may comprise a plurality of limitation points represented in the visual image. Transferring the limitation of the free space from the visual image to the bird's-eye view may further comprise selecting a predetermined number of closest points from the assigned distance data for each limitation point and estimating a distance of each limitation point with respect to the vehicle as an average of the distances of the closest points. The closest points from the distance data points with respect to each limitation point may be selected e.g. by using k-d trees. The closest points are those points from the distance data which have the shortest distances to the respective limitation point. In addition, a weighted average may be used for estimating the distance of the limitation points. The weights for the average may depend on the respective distance of the closest points to the limitation point. If such averages or weighted averages are calculated for estimating the distance of each limitation point, the reliability of this estimation may be improved.

According to a further embodiment, determining the bounding box and the classification for each identified object may comprise applying a second neural network to the visual image. The second neural network may be again a convolutional neural network which allows for a quick creation of the bounding boxes within the visual image. Since a single visual image may be used, such a determination of the bounding boxes and the classifications based on the second neural network may be referred to as single shot multi-box detection.

In addition, determining the classification may comprise estimating a class probability for each boundary box when applying the second neural network. The class probability may provide a certainty value for a specific bounding box enclosing an object of a predefined class or type. The class probability may therefore allow for an assessment of the object identification.

Furthermore, a certainty score may be determined for each segment of the limitation of the free space based on the class probability for each bounding box. That is, the certainty score may be a measure for the reliability of the semantic free space determination based on the respective class probability for each bounding box. The certainty score may be valuable when decisions or actions are taken, e.g. in autonomous driving, for the navigation of the vehicle.

According to another embodiment, a respective distance of a center of each bounding box may be determined with respect to the vehicle based on the three-dimensional distance data. The distance of the center of each bounding box with respect to the vehicle may be assigned to the limitation of the free space in the bird's-eye view. For this assignment, an inverse transformation of a projecting transformation may be applied again which before may be used for the assignment of the distance data to the limitation of the free space. Since the center of each bounding box is assigned instead of a plurality of points of the bounding box, the mathematical and computational effort of the method may be reduced due to the assignment of the center only.

The distance of the center of each bounding box with respect to the vehicle may further be determined based on a predetermined number of assigned distance data which are closest to the respective center of the bounding box. In detail, the distance of the center may be the average of the distances of the closest assigned distance data points. In addition, an object may be selected for the assignment of its bounding box to the limitation of the free space only if the distance of the center of the respective bounding box to at least one of the assigned distance data points is less than a predetermined distance. By this means, objects which do not have a "reasonable distance" with respect to the projected distance points, i.e. a distance being too large to the distance data points detected by the sensor, may be excluded from the assignment of their bounding box to the representation of the free space in the bird's-eye coordinate system.

Furthermore, the segments of the limitation of the free space may be divided equally a fixed and predetermined azimuth angle with respect to the vehicle. Since the segments of the limitation are defined in the bird's-eye view coordinate system, the azimuth angle is also defined in the bird's-eye view. Such a segmentation by a constant azimuth angle may be a further straight forward manner to reduce the computational effort of the method.

In another aspect, the present disclosure is directed at a system for determining a semantic free space in an environment of a vehicle. The system comprises a camera, a sensor, a free space module and a classification module. The camera is configured to capture a two dimensional visual image from the environment of the vehicle, whereas the sensor is configured to capture three dimensional distance data with respect to the vehicle for objects in the environment of the vehicle. The free space module is configured to determine a limitation of a free space within the visual image, to assign the distance data to the visual image, and to transfer the limitation of the free space from the visual image to a bird's-eye view with respect to the vehicle based on the assigned distance data. The classification module is configured to identify objects in the visual image and to determine, for each identified object, a bounding box, and a classification. The classification module is further configured to select objects limiting the free space from the identified objects, to assign the respective bounding box of each selected object to the limitation of the free space in the bird's-eye view, and to classify segments of the limitation of the free space according to the classification of each bounding box of the selected objects.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the system according to the disclosure includes the camera, the sensor and two modules which are installed in the vehicle and which are configured to perform the steps as described above for the corresponding method. Therefore, the benefits, the advantages and the disclosure as described above for the method are also valid for the system according to the disclosure.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
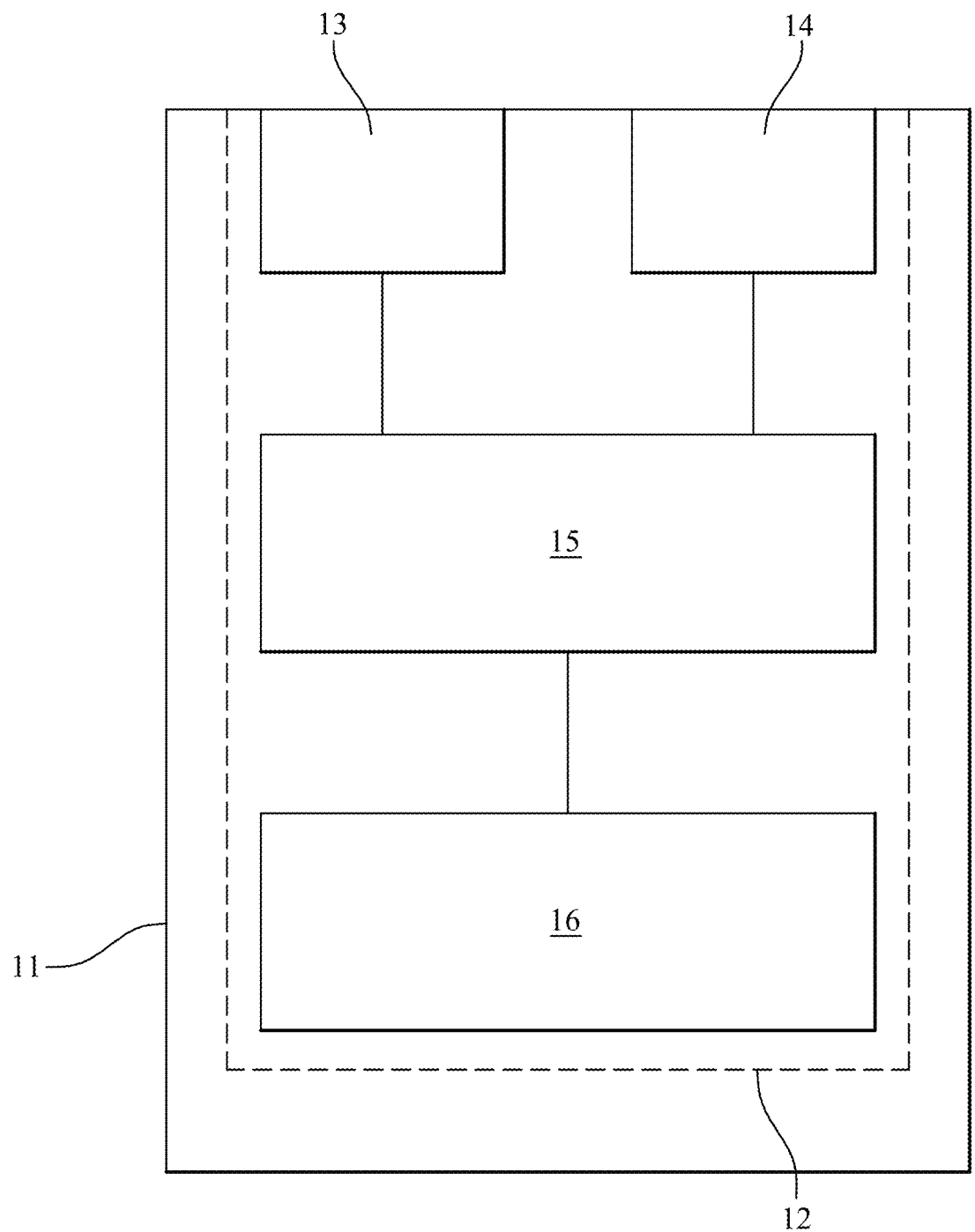
FIG. 1 depicts a schematic diagram of a vehicle comprising a system according to the disclosure.

FIG. 1 schematically depicts a host vehicle 11 which includes a camera 13 and a sensor 14 for monitoring the environment of the vehicle 11. The camera 13 and the sensor 14 belong to a system 12 for determining a semantic free space in the environment of the vehicle 11 according to the disclosure. The system 12 further includes a free space module 15 and a classification module 16 which are connected to each other and which are provided with data from the camera 13 and from the sensor 14.

Figure 2:
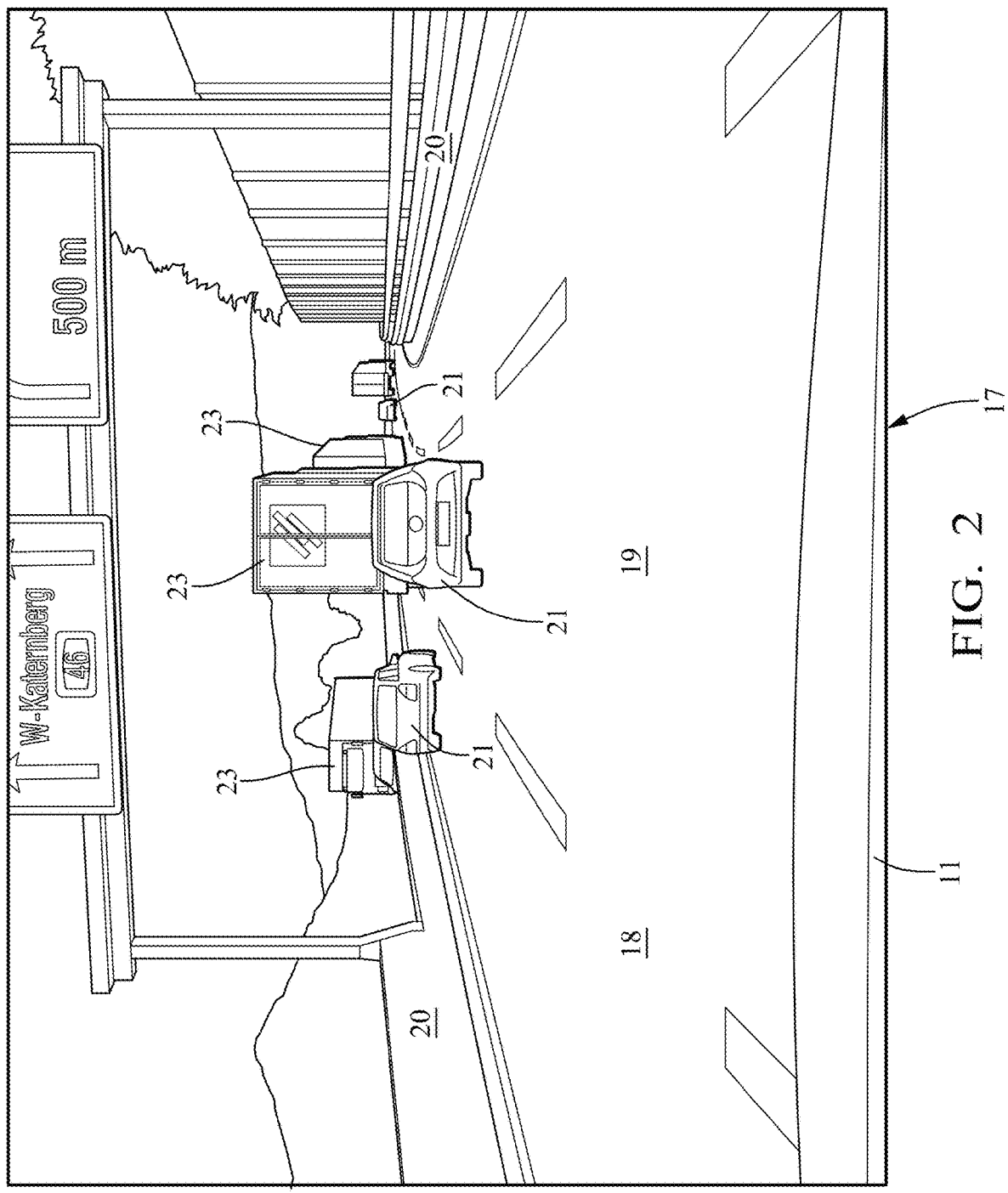
FIG. 2 depicts a visual image taken by a camera of the system as shown in FIG. 1.

The camera 13 is a monocular camera providing a two-dimensional visual image as shown e.g. as camera image 17 in FIG. 2. The sensor 14 (see FIG. 1) is generally a sensor providing three-dimensional distance data for objects in the environment of the vehicle 11. In the present example, the sensor 14 is a LIDAR sensor. However, as an alternative, a radar sensor may also be used for the sensor 14, or any suitable sensor providing distance or depth information.

FIG. 2 depicts the visual image 17 which is provided by the camera 13 (see FIG. 1). The visual image 17 is a two-dimensional representation of the environment in front of the host vehicle 11. The visual image 17 includes a road 18 in front of the vehicle 11 including three lanes 19 and a boundary 20 of the road 18 which is represented by guide rails. In addition, the visual image 17 includes further objects or obstacles in front of the vehicle 11, i.e. other passenger cars 21 and trucks 23 driving in front of the vehicle 11 or in an opposite lane. The boundaries 20 of the road 18 and the other vehicles, i.e. the passenger cars 21 and the trucks 23, limit the drivable area which is available for the host vehicle 11.

Figure 3:
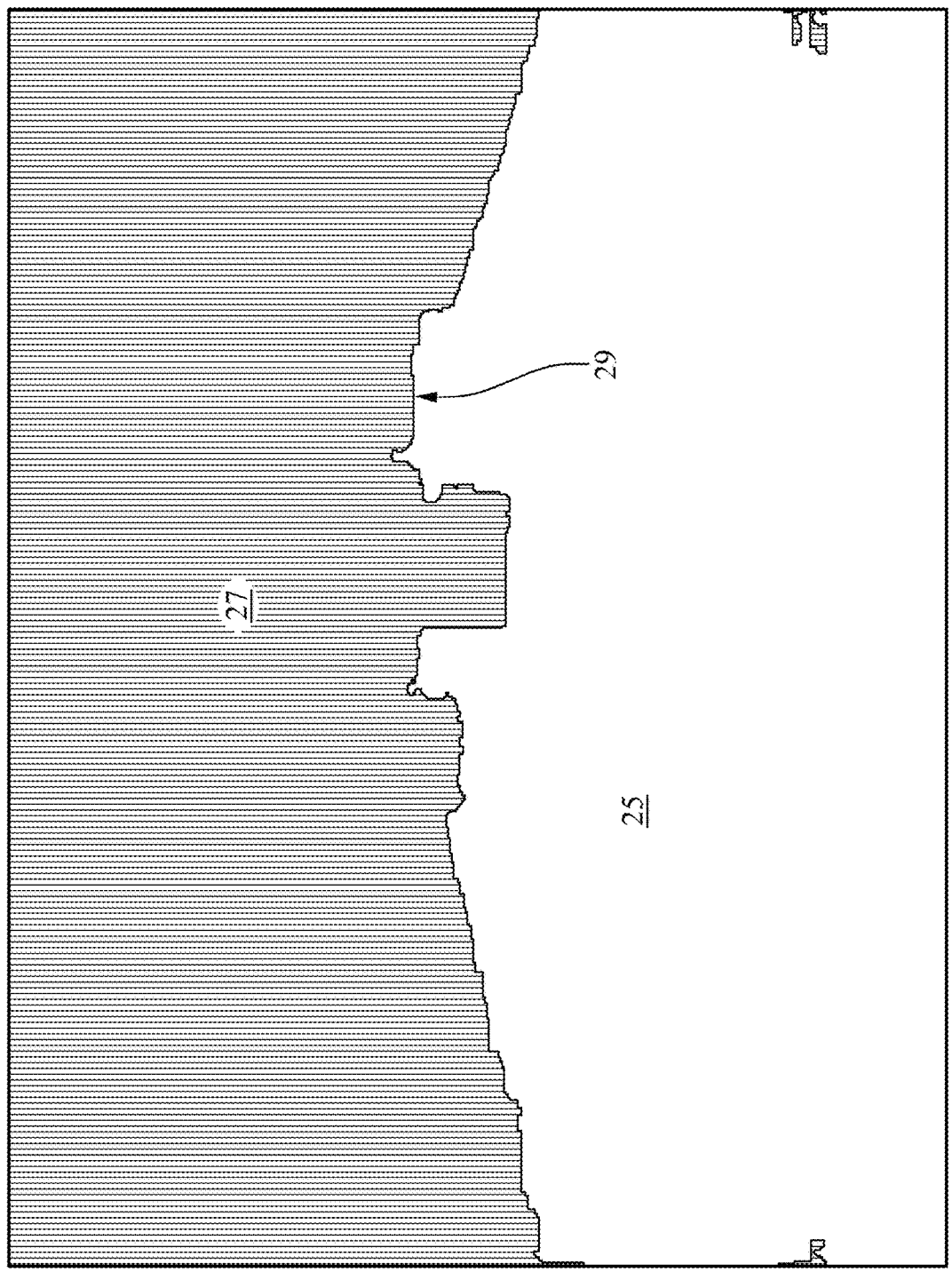
FIG. 3 is a representation of a free space determined from the visual image as shown in FIG. 2.

FIG. 3 depicts a representation of a free space 25 which is derived from the visual image 17 as shown in FIG. 2. In detail, a first convolutional neural network is applied to the two-dimensional visual image 17 as shown in FIG. 2 which is available in the form of pixel data provided by the camera 13 (see FIG. 1). Via the convolutional neural network, a limitation 29 (see FIG. 3) is determined for the free space 25. Therefore, the upper part of FIG. 3 denoted by 27 represents a non-drivable area which is currently not available for the navigation of the host vehicle 11. The limitation 29 of the free space 25 is determined by the free space module 15 (see FIG. 1) which includes the first neural network.

Figure 4:
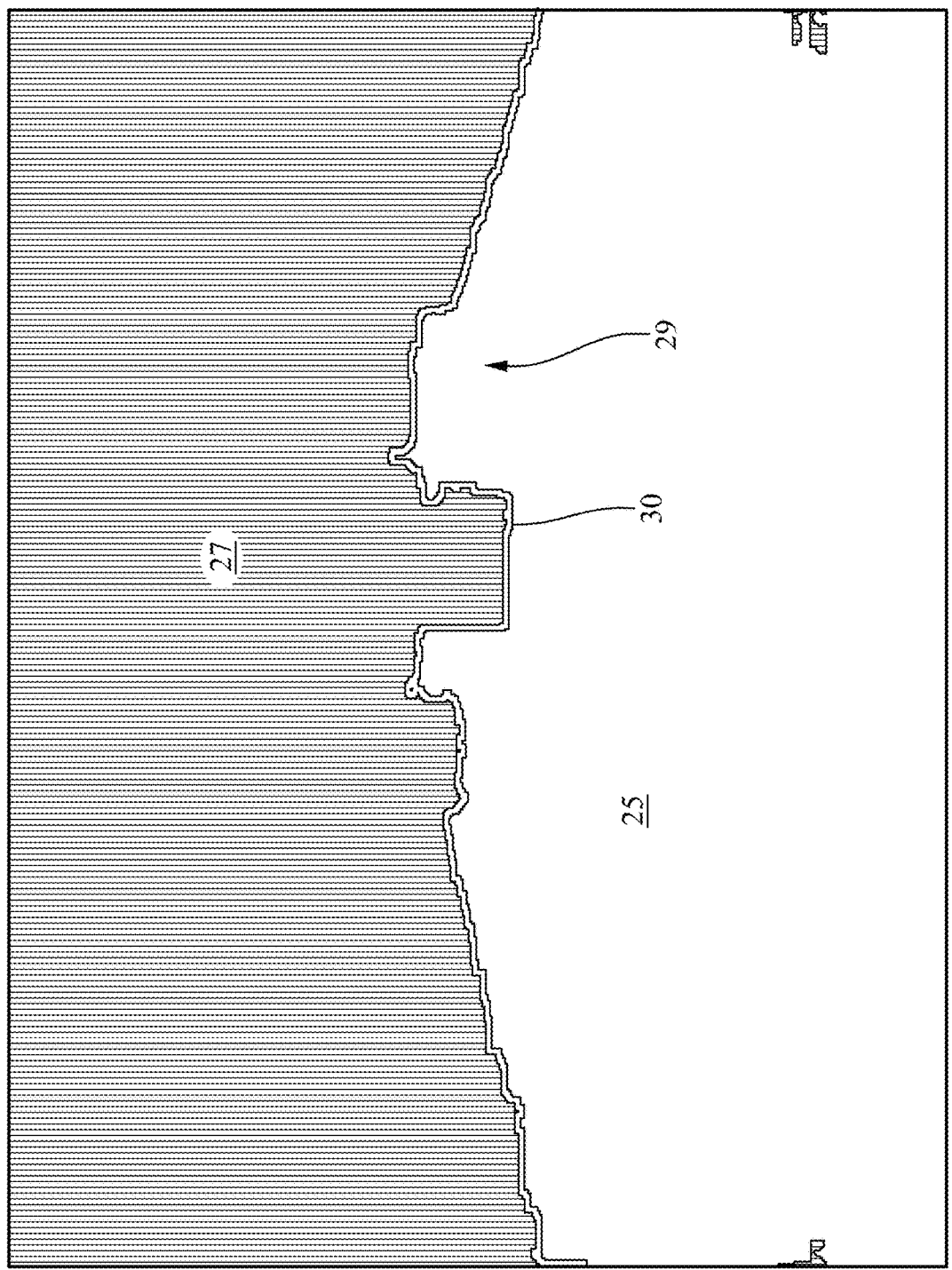
FIG. 4 depicts a contour for the free space of FIG. 3.

FIG. 4 additionally depicts a contour 30 which extends continuously along the limitation 29 between the free space 25 and the non-drivable area 27 as also shown in FIG. 3. The contour 30 is determined by applying a border following algorithm, for which examples are known in the art.

Figure 5:
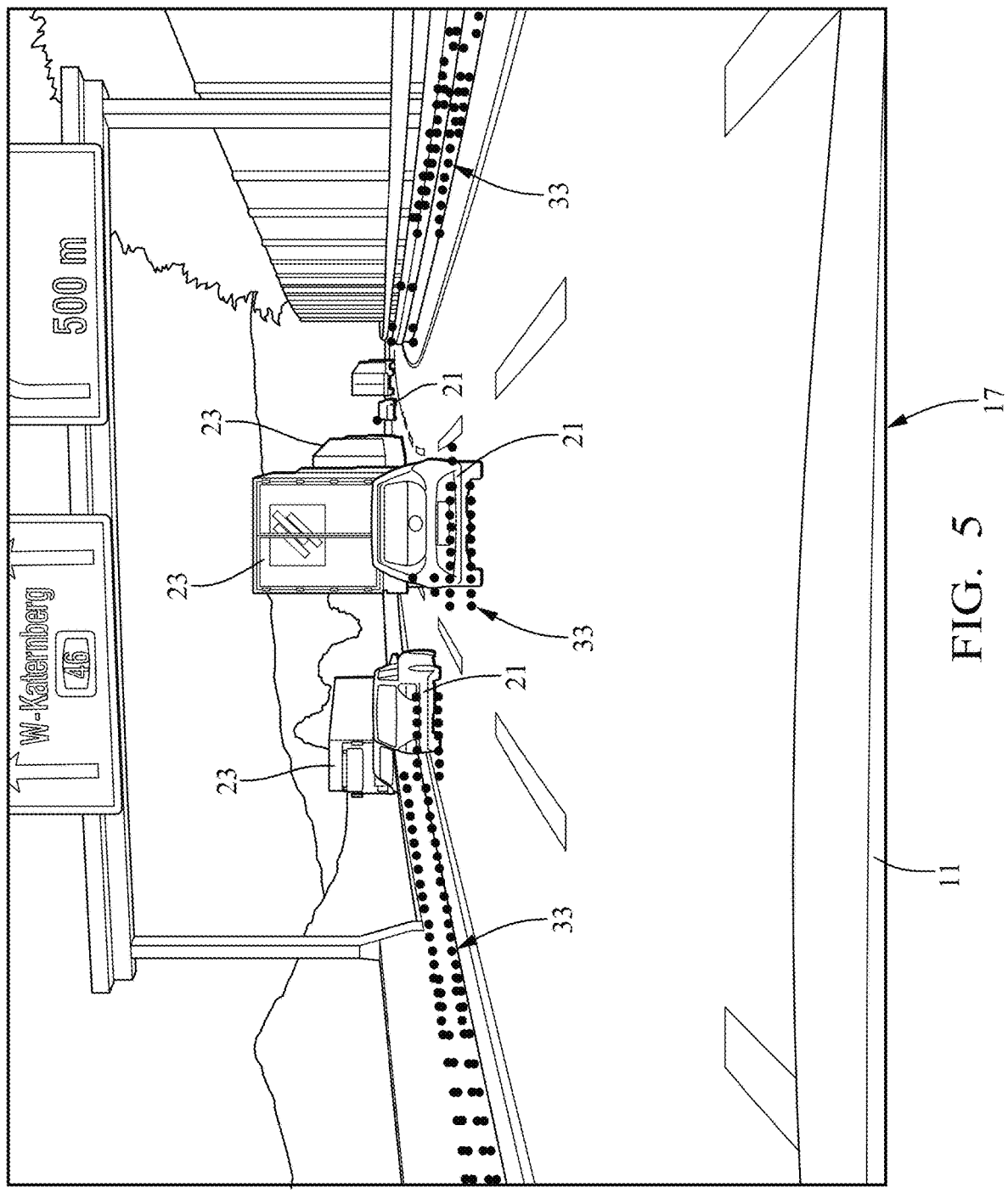
FIG. 5 depicts three-dimensional distance data projected to the visual image as shown in FIG. 2.

FIG. 5 shows the visual image 17 from FIG. 2 together with a projection of three-dimensional data points 33 which are provided by the sensor 14. That is, the three-dimensional data 33 captured by the sensor 14 are transformed to the plane of the visual image 17 via a projecting transformation in order to provide a representation of the data points 33 as shown in FIG. 5. In detail, the data points 33 are provided by the LIDAR system and represent the respective shortest distance of the next obstacle or object with respect to the host vehicle 11.

As may be recognized in FIG. 5, a part of the distance data points 33 are assigned to a respective passenger car 21, whereas another part of the distance points 33 is assigned to the boundaries 20 of the road 18.

Figure 6:
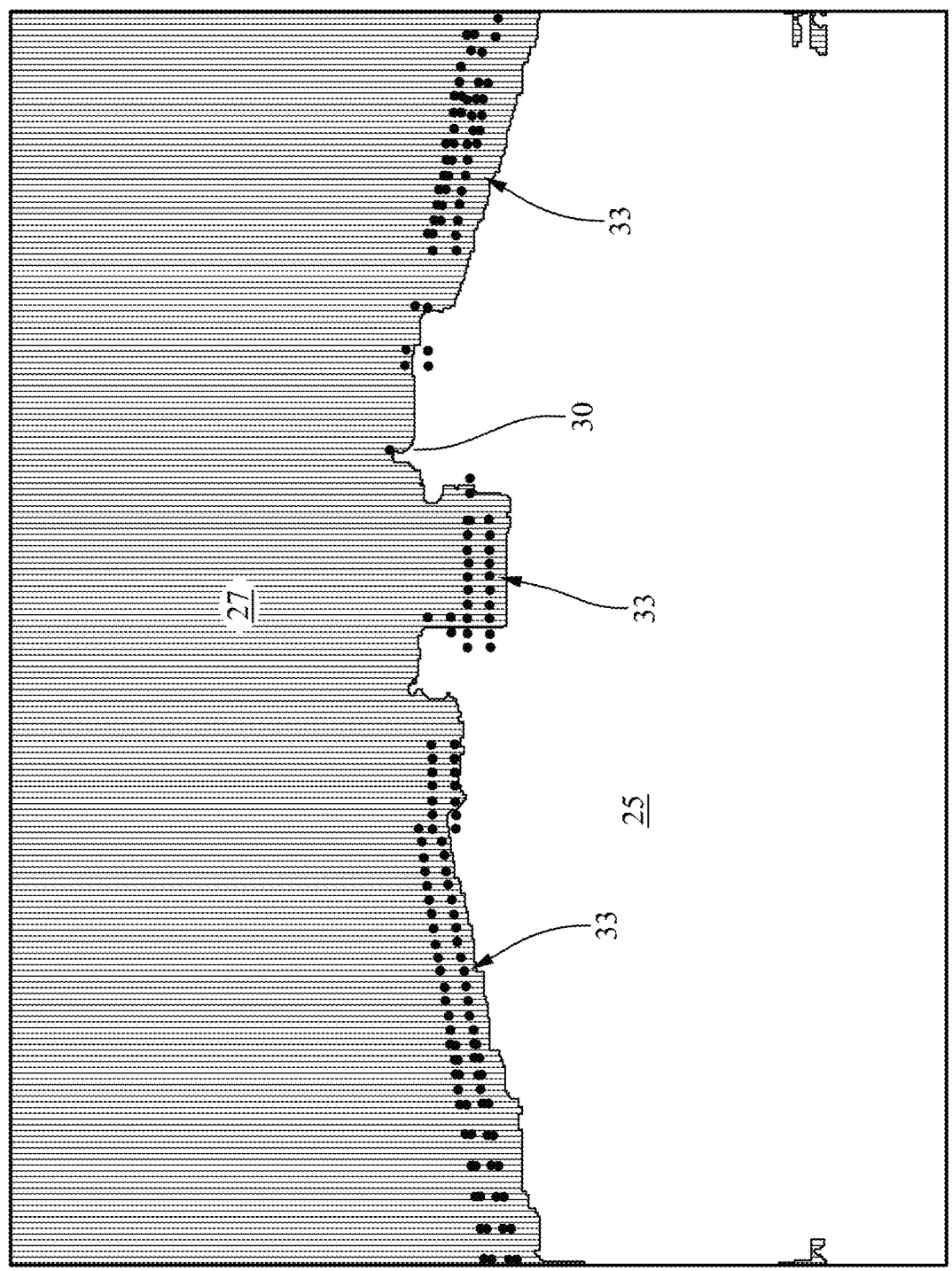
FIG. 6 depicts the three-dimensional distance data from FIG. 5 assigned to the contour of the free space from FIG. 4.

FIG. 6 depicts the assignment of the three-dimensional distance data 33 to the representation of the free space 25 as shown in FIGS. 3 and 4. In detail, the distance data 33 provided by the sensor 14 are related to respective points of the continuous contour 30 of the free space 25 as shown in FIG. 4.

For the assignment of the projected distance data 33 to the points of the limitation 29 or contour 30, a fixed number (e.g. one to five) of closest points from the projected distance data points 33 is determined for each point of the contour 30. The closest points from the distance data 33 with respect to the points of the contour 30 are those points which have the shortest distance within the representation of FIG. 6 with respect to a certain point of the contour 30. For determining the closest points 33 or nearest neighbor points 33 with respect of the points of the contour 30, efficient methods like k-d trees may be used which are known in the art.

In order to determine a distance or "depth" with respect to the host vehicle 11 for each point of the contour 30, an average over the measured distances of the closest distance data points 33 is estimated for each point of the contour 30. This average may be a weighted average wherein each weight depends on the respective distance to the point of the contour 30 under consideration.

Figure 7:
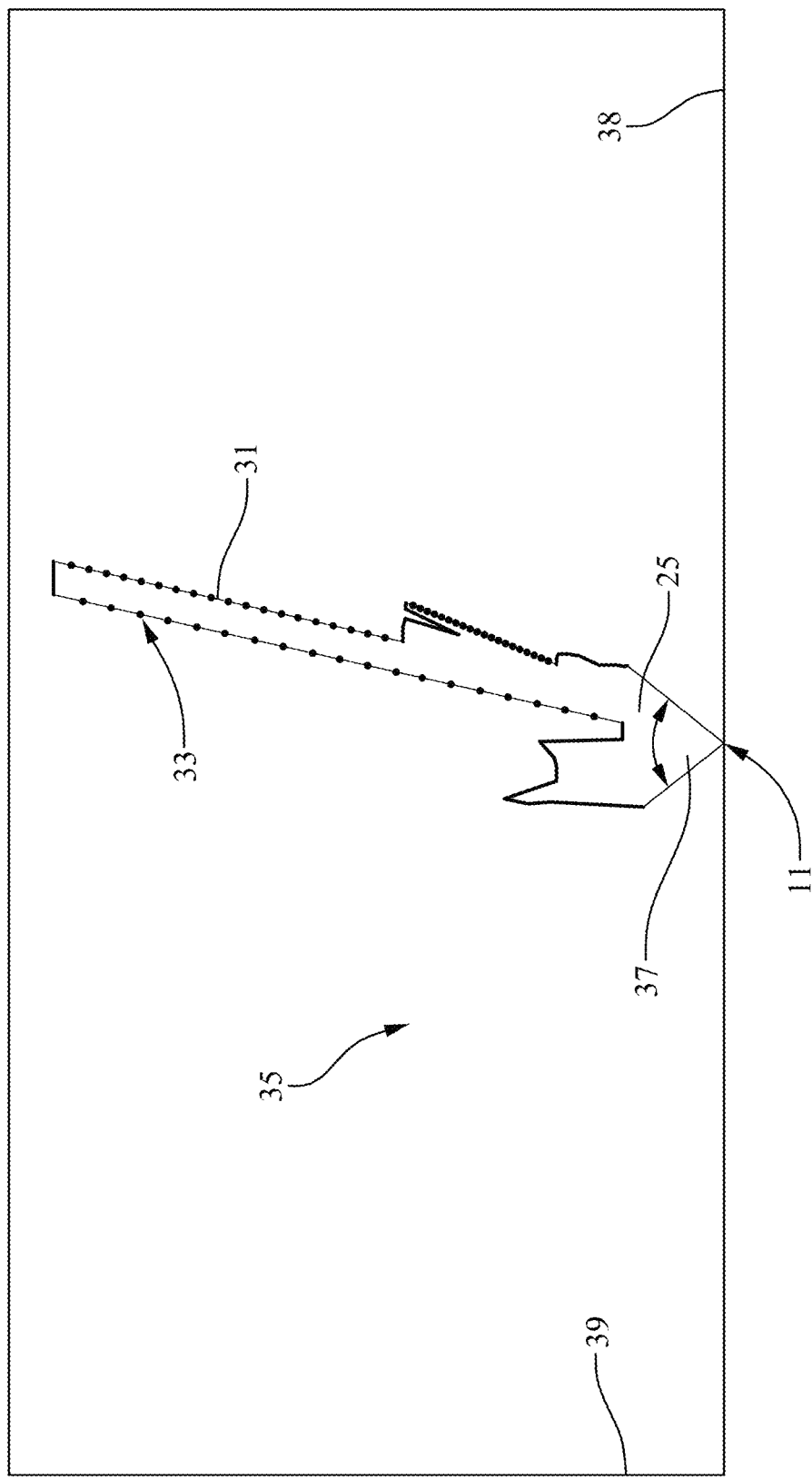
FIG. 7 depicts a representation of the free space as shown in FIGS. 3 and 4 transferred to a bird's-eye view coordinate system.

The estimated distance or depth of the points of the contour 30 is used for transforming the contour 30 to a bird's-eye view coordinate system 35 as shown in FIG. 7. For this transformation, the inverse transform of the projecting transform is used which is applied for projecting the three-dimensional distance data 33 provided by the sensor 14 to the visual image 17, as shown in FIG. 5.

As shown in FIG. 7, the bird's-eye view coordinate system 35 comprises an x-axis 38 and a y-axis 39 which are located in a plane parallel to a tangent to the lane in which the host vehicle 11 is currently driving. In other words, in FIG. 7 one is looking from above at the environment in front of the host vehicle 11. In the bird's-eye view coordinate system 35 of FIG. 7, the free space 25 is shown again which is limited by the limitation 29 or transformed contour 31 which has been transformed from the representation according to the visual image 17 (see FIGS. 3 and 4) to the bird's-eye view of FIG. 7 using the distance information provided by the three-dimensional distance data 33 from the sensor 14. A smoothing by applying a moving average is used for the x- and y-coordinates of the contour 31 in the bird's-eye view coordinate system 35 in order to achieve a smooth representation of the transformed contour 31 of the free space 25.

In the area close to the host vehicle 11, the free space 25 is limited according to an angle 37 representing the instrumental field of view of the camera 13. In addition, the projection of the three-dimensional distance data 33 from the sensor 14 is shown within the bird's-eye view coordinate system 35. Since the respective distance of the points belonging to the contour 31 is determined based on the three-dimensional distance data 33 from the sensor 14, the projection of the distance data 33 is positioned at the contour 31 in the bird's-eye view coordinate system 35.

The free space 25 as shown in FIG. 7 represents the drivable area in front of the host vehicle 11. However, it is not yet known for the points of the contour 31 as shown in FIG. 7 by which type of object the free space or drivable area 25 is restricted. For actions regarding the navigation of the host vehicle 11 it is desirable, however, to have additional information regarding the objects restricting the free space 25, i.e. whether the free space 25 is limited by another vehicle like the cars 21 as shown in FIG. 2, or by a pedestrian or by debris located on one of the lanes 19 (see FIG. 2), for example. Depending on the type of the object limiting the free space 25, different decisions or actions may be taken for the navigation of the host vehicle 11. In other words, additional "semantic" information is desired regarding the objects in the environment of the host vehicle 11.

Figure 8:
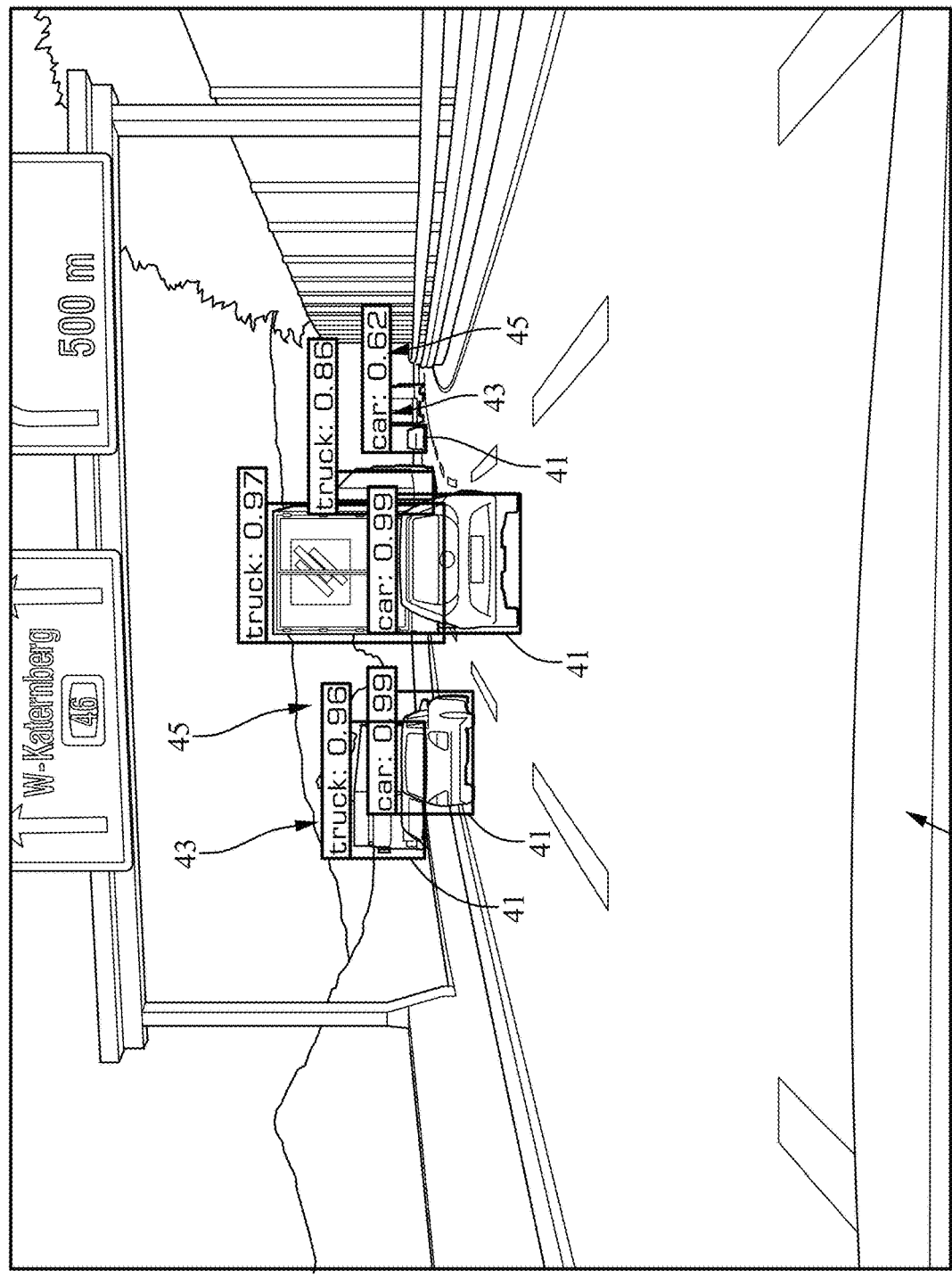
FIG. 8 depicts bounding boxes for objects identified in the visual image from FIG. 2.

In order to provide such semantic information, objects are identified within the visual image 17 provided by the camera 13, as shown in FIG. 8. For each identified object, a two-dimensional bounding box 41 is determined together with a classification 43 of the object. In detail, a respective minimum and maximum value for an x- and a y-coordinate is determined within the visual image 17 in order to determine the frame of respective bounding box 41 which encloses the respective object within the visual image 17. In addition, the classification 43 is determined for each bounding box 41, i.e. whether the respective bounding box encloses a car or a truck, as shown in FIG. 8. That is, the items "car" and "truck" describe the respective detection class or classification 43 for each of the identified objects. Moreover, a detection certainty or class probability 45 is determined for each bounding box 41.

In order to determine the position of each bounding box 41, i.e. its coordinate within the visual image 17, the classification 43 and the class probability 45, a second convolutional neural network is applied to the pixel data of the visual image 17. The determination of the bounding boxes 41 together with the classification 43 and the class probability 45 based on the visual image 17 using a convolutional neural network is also referred to as single shot multi-box detection (SSD) since no segmentation of the visual image 17 is previously performed. The second convolutional neural network is included in the classification module 16 (see FIG. 1). The module also performs all further method steps as described below.

In order to relate the bounding boxes 41 as well as their classification 43 and class probability 45 to the free space 25 as shown in FIG. 7, a center is determined for each bounding box 41, and for each center of the respective bounding box 41 the closest points 33 are determined from the projection of the three-dimensional distance data provided by the sensor 14. The points 33 representing the projection of the three-dimensional distance data 33 are shown together with the bounding boxes 41 in FIG. 9.

The projection of the dimensional distance data points 33 to the visual image 17 is the same as shown in FIG. 5. Therefore, no additional calculation is required regarding the distance data points 33 before assigning these points to the respective centers of the bounding boxes 41. For each center of the bounding boxes 41, a fixed number (e.g. one to five) of closest data points 33 is determined, in the same manner as for the points of the contour 30 as shown in FIGS. 4 and 6. That is, the fixed number of data points 33 is determined for each center of the bounding boxes 41 which have the shortest distance to the respective center of the bounding boxes 41. Again, an average or a weighted average for the distances of the closest data points 33 is calculated for each center of the bounding boxes 41 in order to determine a depth or distance of each center of the bounding boxes 41 with respect to the host vehicle 11.

However, only those centers of the bounding boxes 41 are selected for the further procedure, i.e. for a transform to the bird's-eye view coordinate system 35, for which the distance to the closest distance data point 33 within the visual image 17 is less than a predetermined distance. By this means, only those centers of the bounding boxes 41 are selected which are "reasonably" close to at least one of the distance data points 33.

Figure 9:
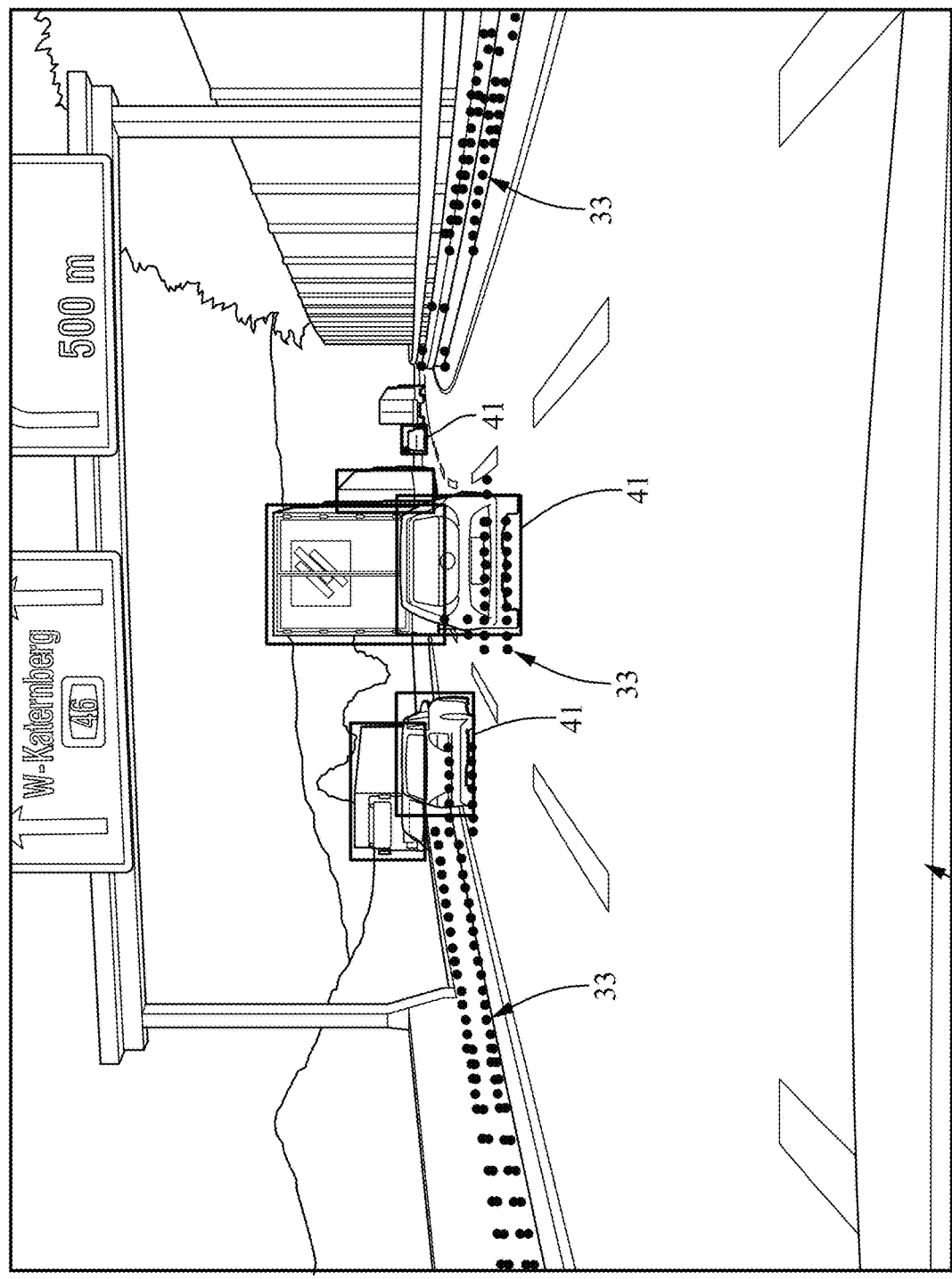
FIG. 9 depicts the assignment of the three-dimensional distance data to the bounding boxes as shown in FIG. 8.

For example, the bounding boxes 41 of the passenger cars 21 as shown in FIG. 9 each comprise distance points 33 which are quite close to the center of the respective bounding boxes 41. In contrast, the bounding boxes 41 of the trucks 23 do not include distance data points 33 which are close to the center of the respective bounding box 41. Therefore, the bounding boxes 41 of the passenger cars as shown in FIG. 9 are selected for the further procedure only and transformed to the bird's-eye view coordinate system 35 as shown in FIG. 10.

Figure 10:
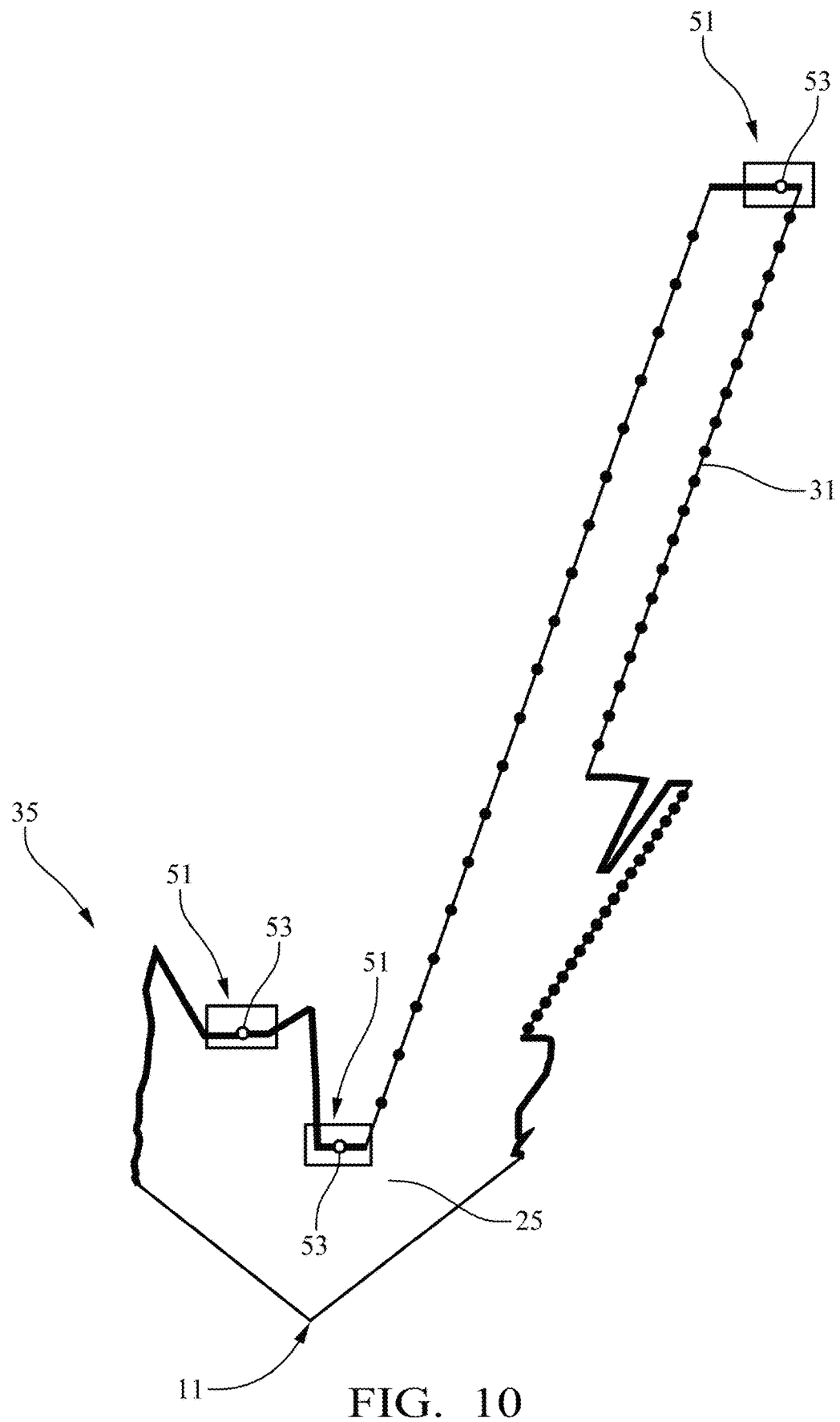
FIG. 10 depicts the assignment of the bounding boxes from FIGS. 8 and 9 to the contour of the free space in the bird's-eye view coordinate system.

FIG. 10 depicts the free space 25 in front of the vehicle 11 in the bird's-eye view coordinate system 35, which has already been shown in FIG. 6. The free space 25 is limited by the transformed contour 31 on which the free dimensional distance data 33 are also shown.

In addition, FIG. 10 depicts transformed bounding boxes 51 which are assigned to the contour 31. The bounding boxes 41 as shown in FIGS. 8 and 9 are transformed from the visual image 17 to the bird's-eye view coordinate system 35 via the same transform as for the contour 30 (see FIGS. 4 and 6), i.e. the inverse transform of the projecting transform which is used for projecting the three-dimensional distance data 33 to the visual image 17.

In detail, the respective center of the bounding boxes 41 (see FIGS. 8 and 9) is transformed from the visual image 17 to a respective transformed center 53 of the bounding box 41 in the bird's-eye view coordinate system 35. In addition, the semantics of the bounding boxes 41 are also known from applying the second neural network to the visual image 17. That is, the type or class of the respective object is known for the representation as shown in FIG. 10 for each bounding box 41. For the present example, it is known that the three bounding boxes 51 each represent a car 21 in FIG. 10.

Figure 11:
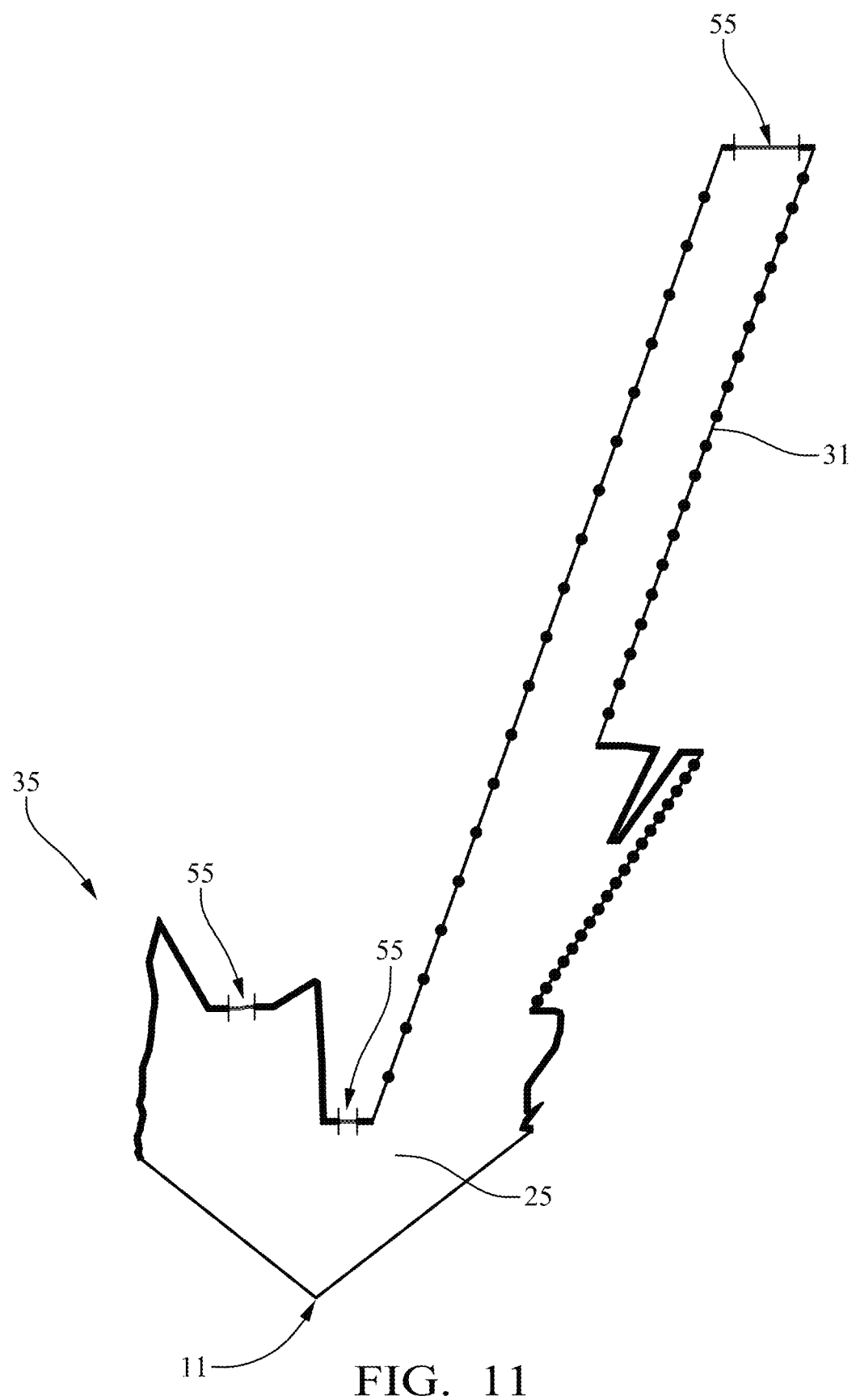
FIG. 11 depicts classified segments for the contour of the free space as shown in FIG. 10.

Finally, the contour 31 of the free space 25 in front of the vehicle 11 is equally divided by a predetermined azimuth angle with respect to the vehicle 11, and each segment 55 of the contour 31 is classified by assigning the respective segment 55 to the respective classification of the center 53 of the bounding box 51 (see FIG. 10) if this segment comprises the center 53 of the bounding box 51. Classified segments 55 are shown in FIG. 11 which includes the same representation of the free space 25 as FIG. 10. That is, the segments 55 of the contour 31 are classified as in "passenger car" 21 which means that the free space 25 in front of the vehicle 11 is limited by a passenger car 21 (see FIG. 2) at the classified segments 55.

In summary, the method according to the disclosure determines the limits or the contour 31 of the free space 25 in front of the vehicle in bird's-eye view via the first neural network, and in addition, the semantic of the segments of the contour 31 is determined via the second neural network such that it will be known which part of the free space 25 is limited by which kind of object. In case that no center of a bounding box can be assigned to a specific segment of the contour 31, a default classification may be assumed for these segments, e.g. a classification as boundary 20 of the road 18 (see FIG. 2) or a limitation by the instrumental field of view of the camera 13.

In addition, a certainty score is estimated for each classified segment 55 of the contour 31 based on the class probability 45 which is determined for each bounding box 41 via the second neural network. The certainty score and the semantic free space represented by the segments of the contour 31 (see FIG. 11) can be used for the navigation of the host vehicle 11, e.g. in autonomous driving.

What is claimed is:
1. A method, comprising:
 capturing, via a camera of a vehicle in an environment, a two dimensional visual image of the environment;
 determining, with a processor of the vehicle, within the visual image, a limitation of a free space with respect to the vehicle;
 capturing, via a sensor of the vehicle, for objects in the environment, three dimensional distance data with respect to the vehicle;
 based on assigning the distance data to the visual image, transferring the limitation of the free space from the visual image to a bird's-eye view, with respect to the vehicle;
 determining, for each object identified in the visual image, a bounding box and a classification;
 selecting objects identified in the visual image that are limiting the free space;
 assigning the bounding box of each of the objects selected to the limitation of the free space transferred to the bird's-eye view; and
 according to the classification of each of the objects selected, classifying segments of the limitation of the free space transferred to the bird's-eye view, thereby determining a semantic free space in the environment of the vehicle,
 wherein determining the limitation of the free space comprises determining the limitation of the free space based on executing a border following algorithm to determine the limitation of the free space as being a continuously extending contour of the free space.

2. The method according to claim 1,
wherein determining the limitation of the free space comprises determining the limitation of the free space based on applying a first neural network to the visual image.

3. The method according to claim 1,
wherein assigning the distance data to the visual image comprises applying a projecting transformation of the three dimensional distance data to the two dimensional visual image.

4. The method according to claim 3,
wherein transferring the limitation of the free space from the visual image to the bird's-eye view comprises applying an inverse transformation of the projecting transformation to the limitation of the free space.

5. The method according to claim 1,
wherein the limitation of the free space comprises a plurality of limitation points represented in the visual image, and transferring the limitation of the free space from the visual image to the bird's-eye view comprises:
selecting a predetermined number of closest points from distance data for each of the limitation points; and
estimating a distance, with respect to the vehicle, for each of the limitation points as an average of distances, with respect to the vehicle, for each of the closest points.

6. The method according to claim 1,
wherein determining the bounding box and the classification for each of the objects selected comprises applying a second neural network to the visual image.

7. The method according to claim 6,
wherein determining the classification comprises estimating a class probability for the bounding box for each of the objects selected when applying the second neural network.

8. The method according to claim 7, further comprising:
determining a certainty score for each segment of the limitation of the free space based on the class probability for the bounding box for each of the objects selected.

9. The method according to claim 1, further comprising:
determining, with respect to the vehicle, based on the three dimensional distance data, a distance of a center for the bounding box for each of the objects selected; and
assigning the distance of the center for the bounding box for each of the objects selected to the limitation of the free space in the bird's-eye view.

10. The method according to claim 9,
wherein determining the distance of the center for the bounding box for each of the objects selected comprises determining the distance of the center for the bounding box for each of the objects selected based on a predetermined number of assigned distance data being closest to the center of that bounding box.

11. The method according to claim 10,
wherein assigning the distance of the center for the bounding box for each of the objects selected to the limitation of the free space in the bird's-eye view comprises assigning the distance of the center for the bounding box for each of the objects selected only if the distance of the center of the bounding box to at least one of the assigned distance data being less than a predetermined distance.

12. The method according to claim 1, further comprising:
dividing the segments of the limitation of the free space equally by a fixed and predetermined azimuth angle with respect to the vehicle.

13. A system, comprising:
a processor for a vehicle, the processor configured to:
capture, via a camera for the vehicle, a two dimensional visual image of an environment;
determine, within the visual image, a limitation of a free space with respect to the vehicle;
capture, via a sensor for the vehicle, for objects in the environment, three dimensional distance data with respect to the vehicle;
based on assigning the distance data to the visual image, transfer the limitation of the free space from the visual image to a bird's-eye view, with respect to the vehicle;
determine, for each object identified in the visual image, a bounding box and a classification;
select objects identified in the visual image that are limiting the free space;
assign the bounding box of each of the objects selected to the limitation of the free space transferred to the bird's-eye view; and
classify segments of the limitation of the free space transferred to the bird's-eye view according to the classification of each of the objects selected to determine a semantic free space in the environment of the vehicle,
wherein determining the limitation of the free space comprises determining the limitation of the free space based on executing a border following algorithm to determine the limitation of the free space as being a continuously extending contour of the free space.

14. The system of claim 13, further comprising:
the camera for the vehicle; and
the sensor for the vehicle.

15. The system of claim 14, further comprising the vehicle, wherein the processor is configured as a free space module to output the semantic free space determined in the environment of the vehicle.

16. A non-transitory computer readable storage medium comprising instructions, that when executed, configure a processor for a vehicle to:
capture, via a camera for the vehicle, a two dimensional visual image of an environment;
determine, within the visual image, a limitation of a free space with respect to the vehicle;
capture, via a sensor for the vehicle, for objects in the environment, three dimensional distance data with respect to the vehicle;
based on assigning the distance data to the visual image, transfer the limitation of the free space from the visual image to a bird's-eye view, with respect to the vehicle;
determine, for each object identified in the visual image, a bounding box and a classification;
select objects identified in the visual image that are limiting the free space;
assign the bounding box of each of the objects selected to the limitation of the free space transferred to the bird's-eye view; and
classify segments of the limitation of the free space transferred to the bird's-eye view according to the classification of each of the objects selected to determine a semantic free space in the environment of the vehicle, wherein determining the limitation of the free space comprises determining the limitation of the free space based on executing a border following algorithm to determine the limitation of the free space as being a continuously extending contour of the free space.

17. The computer readable storage medium according to claim 16,
wherein the instructions, when executed, configure the processor to determine the limitation of the free space by determining the limitation of the free space based on applying a first neural network to the visual image.

18. The computer readable storage medium according to claim 16,
wherein the instructions, when executed, configure the processor to assign the distance data to the limitation of the free space by applying a projecting transformation of the three dimensional distance data to the two dimensional visual image.

19. A method, comprising:
capturing, via a camera of a vehicle in an environment, a two dimensional visual image of the environment;
determining, with a processor of the vehicle, within the visual image, a limitation of a free space with respect to the vehicle;
capturing, via a sensor of the vehicle, for objects in the environment, three dimensional distance data with respect to the vehicle;
based on assigning the distance data to the visual image, transferring the limitation of the free space from the visual image to a bird's-eye view, with respect to the vehicle;
determining, for each object identified in the visual image, a bounding box and a classification;
selecting objects identified in the visual image that are limiting the free space;
assigning the bounding box of each of the objects selected to the limitation of the free space transferred to the bird's-eye view;
according to the classification of each of the objects selected, classifying segments of the limitation of the free space transferred to the bird's-eye view, thereby determining a semantic free space in the environment of the vehicle;
determining, with respect to the vehicle, based on the three dimensional distance data, a distance of a center for the bounding box for each of the objects selected; and
assigning the distance of the center for the bounding box for each of the objects selected to the limitation of the free space in the bird's-eye view.

20. A method, comprising:
capturing, via a camera of a vehicle in an environment, a two dimensional visual image of the environment;
determining, with a processor of the vehicle, within the visual image, a limitation of a free space with respect to the vehicle;
capturing, via a sensor of the vehicle, for objects in the environment, three dimensional distance data with respect to the vehicle;
based on assigning the distance data to the visual image, transferring the limitation of the free space from the visual image to a bird's-eye view, with respect to the vehicle;
determining, for each object identified in the visual image, a bounding box and a classification;
selecting objects identified in the visual image that are limiting the free space;
assigning the bounding box of each of the objects selected to the limitation of the free space transferred to the bird's-eye view;
according to the classification of each of the objects selected, classifying segments of the limitation of the free space transferred to the bird's-eye view, thereby determining a semantic free space in the environment of the vehicle; and
dividing the segments of the limitation of the free space equally by a fixed and predetermined azimuth angle with respect to the vehicle.

* * * * *